(12) United States Patent
Santelli, Jr.

(10) Patent No.: US 6,669,427 B1
(45) Date of Patent: Dec. 30, 2003

(54) FASTENING ELEMENT HAVING A FLEXIBLE PULL CORD

(76) Inventor: Albert Santelli, Jr., 58 Hillcrest Rd., Martinsville, NJ (US) 08836

( * ) Notice: Subject to any disclaimer, the term of this patent is extended or adjusted under 35 U.S.C. 154(b) by 0 days.

(21) Appl. No.: 10/224,939

(22) Filed: Aug. 21, 2002

(51) Int. Cl.[7] .......................... F16B 19/00; F16B 33/04
(52) U.S. Cl. ................... 411/510; 411/339; 411/908; 411/913
(58) Field of Search .................. 411/338, 339, 411/508, 509, 510, 907, 908, 913

(56) References Cited

U.S. PATENT DOCUMENTS

| | | | | |
|---|---|---|---|---|
| 1,974,160 A | * | 9/1934 | Peirson | 411/907 X |
| 3,090,115 A | | 5/1963 | Carr | 29/450 |
| 3,330,522 A | * | 7/1967 | Stewart | 411/907 X |
| 3,810,279 A | | 5/1974 | Swick et al. | 24/73 |
| 4,573,844 A | * | 3/1986 | Smith | 411/510 X |
| 4,672,719 A | * | 6/1987 | Scott | 411/510 X |
| 4,802,388 A | | 2/1989 | Roberts | 81/15.7 |

FOREIGN PATENT DOCUMENTS

| | | | | |
|---|---|---|---|---|
| GB | 2 058 990 A | 9/1980 | | F16B/19/06 |

* cited by examiner

Primary Examiner—Neill Wilson
(74) Attorney, Agent, or Firm—Duane Morris LLP

(57) ABSTRACT

A fastening element for fastening one or more parts to one another, the fastening element including a head, a shank depending form the head, and a flexible pull cord coupled to an end surface of the shank.

8 Claims, 3 Drawing Sheets

FASTENING ELEMENT HAVING A FLEXIBLE PULL CORD

RELATED APPLICATIONS

U.S. patent application, Ser. No. 10/224,990, entitled "REUSABLE CERVICAL COLLAR HAVING A CHIN STRAP MEMBER FASTENING ELEMENT WITH A PULL CORD", filed Aug. 22, 2002.

FIELD OF THE INVENTION

This invention relates to fastening elements. More specifically, this invention relates to a fastening element having a flexible pull cord that facilitates fastening parts to one another in a crowded location or where an obstruction exists.

BACKGROUND OF THE INVENTION

There are many different types of fastening elements in the prior art for fastening parts to one another. Many of these fastening elements are made from plastic and are of the type which includes a head, a shank depending from the bottom of the head, and a plurality of gripping elements spaced circumferentially along the shank. The shank of fastening element passes through apertures in the parts such that the gripping elements engage the surfaces of the apertures to fasten the parts to one another.

One problem associated with the above mentioned fastening element is that, in many cases, the parts to be fastened to one another are disposed in a crowded location or an obstruction exists, that makes it is difficult and sometimes impossible to apply a pushing force to the head of the fastening element to insert it through the apertures in the parts.

Accordingly, a fastening element is needed which can be used for fastening parts to one another in a crowded location or where an obstruction exists.

SUMMARY OF THE INVENTION

A fastening element is described for fastening one or more parts to one another. The fastening element comprises a head, a shank depending form the head, and a flexible pull cord coupled to an end surface of the shank.

In one embodiment of the invention, a frangible area removeably couples the pull cord to the end surface of the shank.

DETAILED DESCRIPTION OF THE INVENTION

Figure 1:
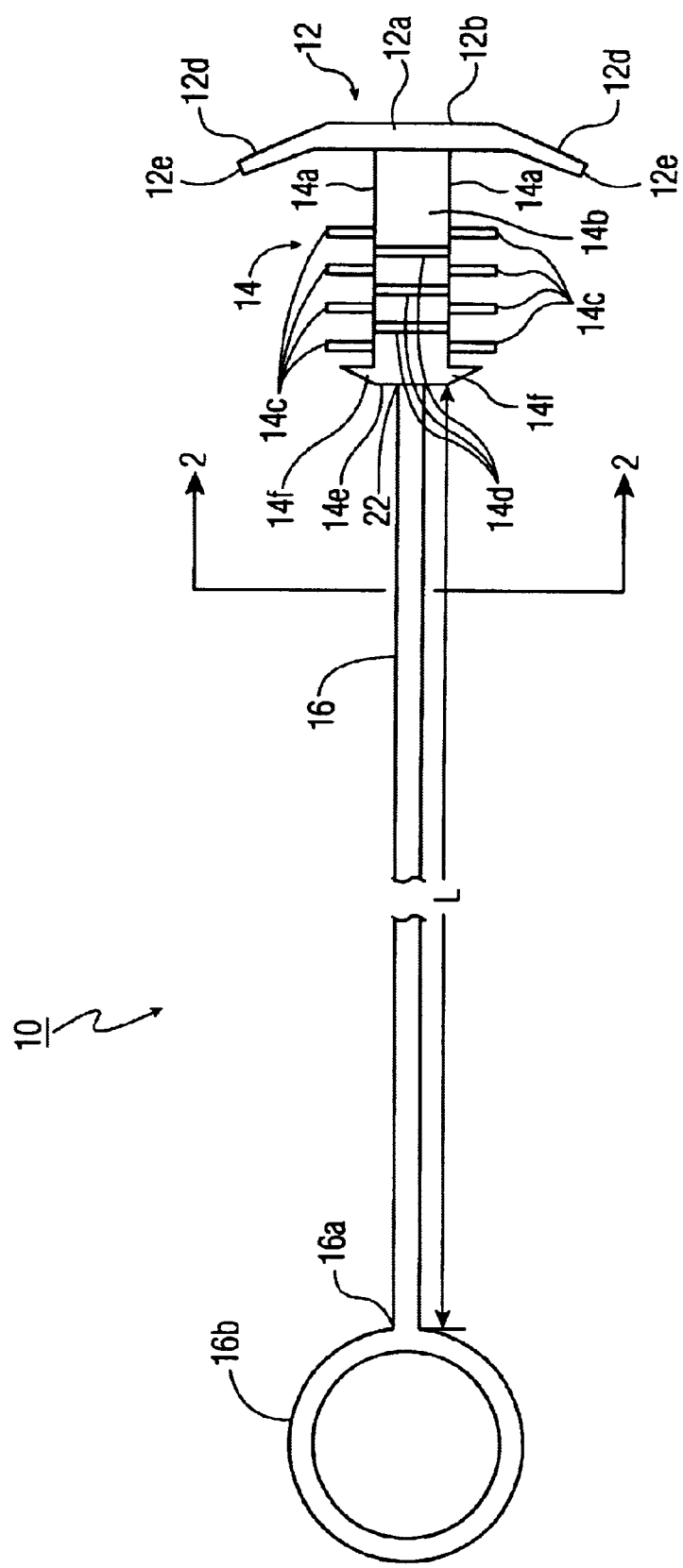
FIG. 1 is an elevational view of a fastening element according to an exemplary embodiment of the present invention.
Figure 2:
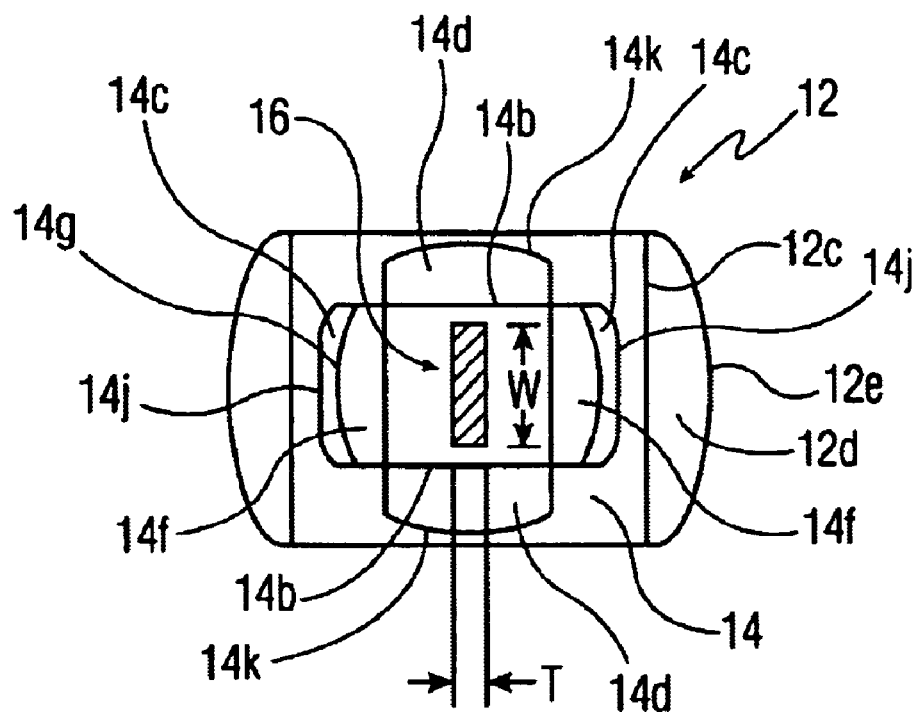
FIG. 2 is a sectional view through line 2—2 of FIG. 1.
Figure 3:
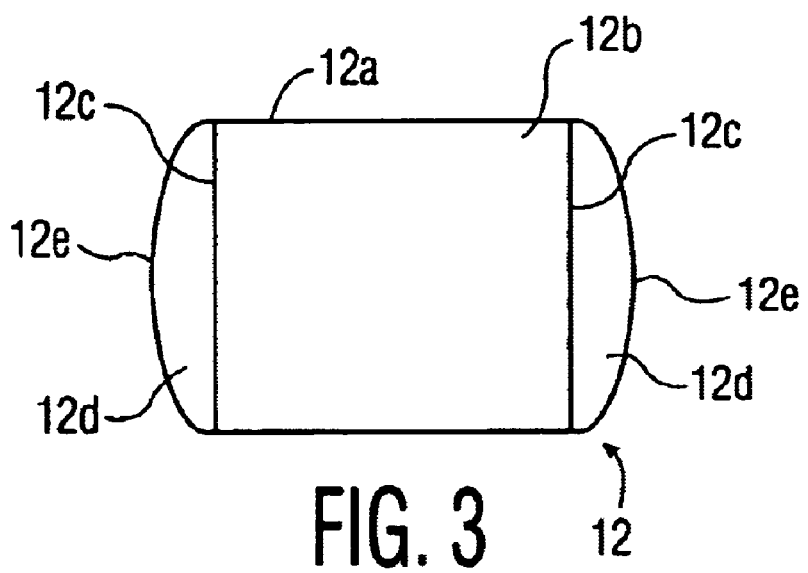
FIG. 3 is an end view of the fastening element of FIG. 1.

Referring collectively to FIGS. 1–3, there is shown a fastening element 10 according to an exemplary embodiment of the present invention. The fastening element 10 generally comprises a head 12, a shank 14 depending from the head 12 and a flexible pull cord 16 extending from the shank 14. The fastening element 10 may be used in a variety of different applications for mechanically fastening one or more parts together.

The head 12 of the fastening element 10 includes a rigid central portion 12a having a substantially planar top surface 12b formed in a rectangular configuration, and opposing, tapered, flanges 12d extending downwardly from two opposing sides 12c of the central portion 12a. The leading edge 12e of each flange 12d is arcuately formed to define a convex edge shape. The flanges 12d are thinner than the central portion 12a and therefore, flexible relative thereto. Accordingly, the flanges 12d seal the surface around the aperture 32 of the immediately adjacent part 30 (FIG. 4) and/or accommodate tolerance variations.

It should be understood that the head 12 shown and described herein is exemplary, and that the fastening element 10 of the invention may utilize any suitable well known head design.

The shank 14 of the fastening element 10 is a rigid, elongated member having a generally square cross-sectional configuration that defines a first pair of substantially planar, axially extending opposing side surfaces 14a and a second pair of substantially planar, axially extending opposing side surfaces 14b. The opposing side surfaces 14a each include a plurality of equally-spaced flexible gripping elements or fingers 14c and the opposing side surfaces 14b each include a plurality of equally-spaced flexible gripping fingers 14d. The gripping fingers 14c and 14d extend outwardly from, and generally perpendicular to their respective side surfaces 14a and 14b, and have respective arcuate terminal edges 14j and 14k. The gripping fingers 14c and 14d are disposed in an alternating, staggered manner such that the gripping fingers 14c on the opposing side surfaces 14a are disposed in planes that lie between the planes of the gripping fingers 14d disposed on the opposing side surfaces 14b. The gripping fingers 14c and 14d retain the fastening element 10 in the apertures of the parts, thus securing the parts to one another, but can be forcibly withdrawn from the apertures when desired to separate the parts from one another.

A pair of substantially rigid, lead-in elements 14f are formed laterally adjacent the free end surface 14e of the shank 14. The lead-in elements 14f extend from the opposing side surfaces 14a and have arcuate terminal edges 14g. As shown in FIG. 5A, each lead-in element 14f has a trailing surface 14h that extends perpendicular to the side surface 14b, and an inclined leading surface 14i that leans back toward the trailing surface 14h to facilitate entry into the apertures 32, 42 of the parts 30, 40 (FIG. 4).

It should be understood that the shank 14 shown and described herein is exemplary, and that the fastening element 10 of the invention may utilize any suitable well known shank design.

Figure 5A:
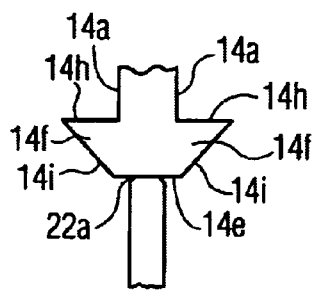
FIG. 5A is a partial view of the shank and pull cord showing a frangible connection according to first exemplary embodiment of the present invention at the pull cord shank interface, for removably coupling the pull cord to the shank.
Figure 5B:
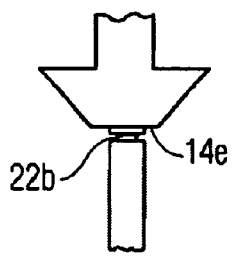
FIG. 5B is a partial view of the shank and pull cord showing a frangible connection according to a second exemplary embodiment of the present invention adjacent the pull cord shank interface, for removably coupling the pull cord to the shank.

The flexible pull cord 16 extends from the free end surface 14e of the shank 14. The flexible pull cord 16 may be rectangular in cross-section and formed in any desired length width, and thickness. In one exemplary embodiment, the flexible pull 16 cord may be about 8 inches in length (L in FIG. 1), about 0.100 inches wide (W in FIG. 2), and about 0.050 inches thick (T in FIG. 3). The flexible pull cord 16 is preferably made detachable from the end surface 14e of the shank 14. Depending upon the material used for making the fastening element 10 and the cross-sectional area of the pull cord 16, no special frangible connection structure is typically required to facilitate detachment of the pull cord 16 from the end surface 14e of the shank 14. If necessary, however, a frangible connection 22 at or near the pull cord shank interface may be provided. The frangible connection 22 may be formed by an area 22a having a reduced cross-section (FIG. 5A), a score line 22b (FIG. 5B), or by any other conventional frangible connection. The terminal end 16a of the pull cord 16 is terminated with a flexible, finger grasping member 16b for manually grasping the pull cord with one's fingers. The grasping member 16b may be ring-shaped as in the shown embodiment, or any other suitable shape or design. The flexible grasping member 16b can be bent into a shape that allows it to be threaded through one or more of the apertures formed in the parts, then bent back to its original shape after threading through the apertures.

Figure 4:
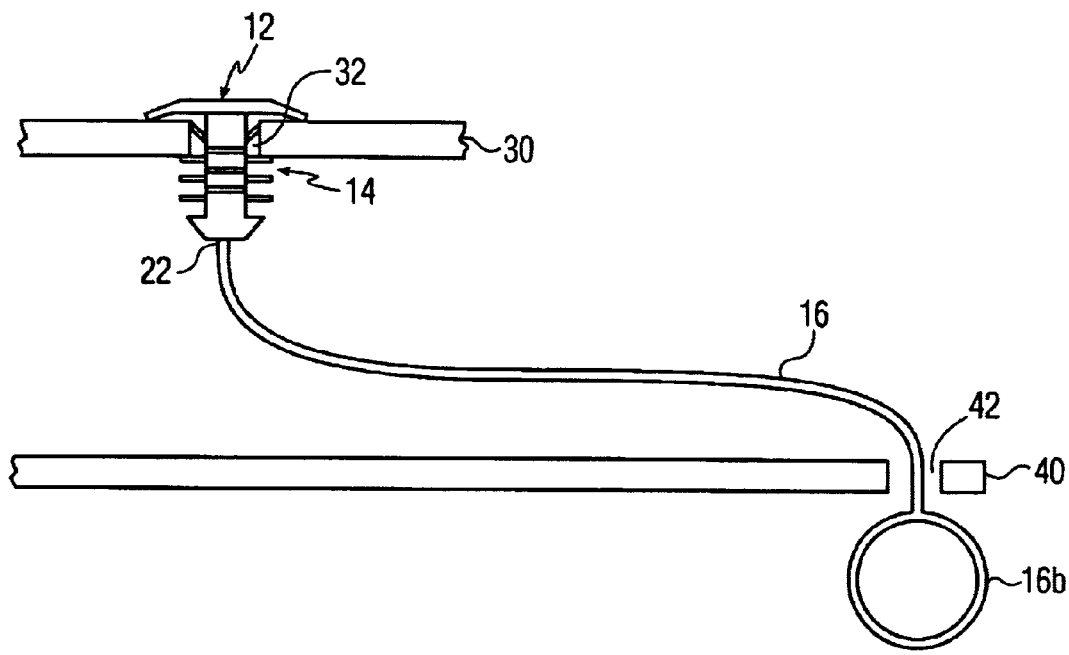
FIG. 4, is a plan view depicting the use of the fastening element of the present invention to fasten two parts to one another using the pull cord.

As depicted in FIG. 4, the flexible pull cord 16 can be bent to enable the fastening element 10 to be pulled through the apertures 32, 42 in the parts 30, 40 being fastened to one another from a remote location. This is particularly important in cases where a crowded condition or an obstruction prevents the application of a pushing force to the head 12 of the fastening element 10. The flexibility of the pull cord 16 allows the fastening element 10 to be pulled at an angle relative to the longitudinal axis of the shank 14, thus making it possible to fastened the parts 30, 40 together when there is a crowded condition or obstruction on the pulling side of the part assembly. Additionally, the pull cord 16 can be detached from the fastening device 10 once the parts are fastened to one another by, for example, bending it back and forth at the end surface 14e of the shank 14 (or at the frangible connection 22), until it detaches therefrom.

The fastening element 10 is typically constructed as a unitary structure from a suitable plastic material, such as nylon, high density polyethylene, or polypropylene, and can be made using conventional plastic forming methods including for example, injection molding.

While the foregoing invention has been described with reference to the above embodiments, various modifications and changes can be made without departing from the spirit of the invention. Accordingly, all such modifications and changes are considered to be within the scope of the appended claims.

What is claimed is:

1. A fastening element comprising:

a head;

a shank depending form the head; and a flexible pull cord detachably coupled to an end surface of the shank;

wherein the fastening element is unitarily formed from a plastic material.

2. The fastening element according to claim 1, wherein the shank includes a plurality of gripping elements.

3. The fastening element according to claim 1, wherein the shank includes a lead-in element adjacent the end surface of the shank.

4. The fastening element according to claim 1, wherein the pull cord includes a grasping member coupled to an end thereof for manually grasping the end of the pull cord.

5. The fastening element according to claim 4, wherein the pull member is flexible.

6. The fastening element according to claim 1, further comprising a frangible area detachably coupling the pull cord to the end surface of the shank.

7. The fastening element according to claim 6, wherein the frangible area includes an area of reduced cross-section.

8. The fastening element according to claim 6, wherein the frangible area includes a score-line.

\* \* \* \* \*

UNITED STATES PATENT AND TRADEMARK OFFICE
CERTIFICATE OF CORRECTION

PATENT NO.    : 6,669,427 B1
DATED         : December 30, 2003
INVENTOR(S)   : Albert Santelli, Jr.

It is certified that error appears in the above-identified patent and that said Letters Patent is hereby corrected as shown below:

<u>Title page,</u>
Item [57], ABSTRACT,
Line 3, change the word "form" to -- from --.

<u>Column 1,</u>
Line 43, change the word "form" to -- from --.

<u>Column 4,</u>
Line 15, change the word "form" to -- from --.

Signed and Sealed this

Fifteenth Day of June, 2004

JON W. DUDAS
*Acting Director of the United States Patent and Trademark Office*